3,480,596
PROCESS OF FORMING POLYMERIC MATERIAL OF INCREASED RELATIVE VISCOSITY

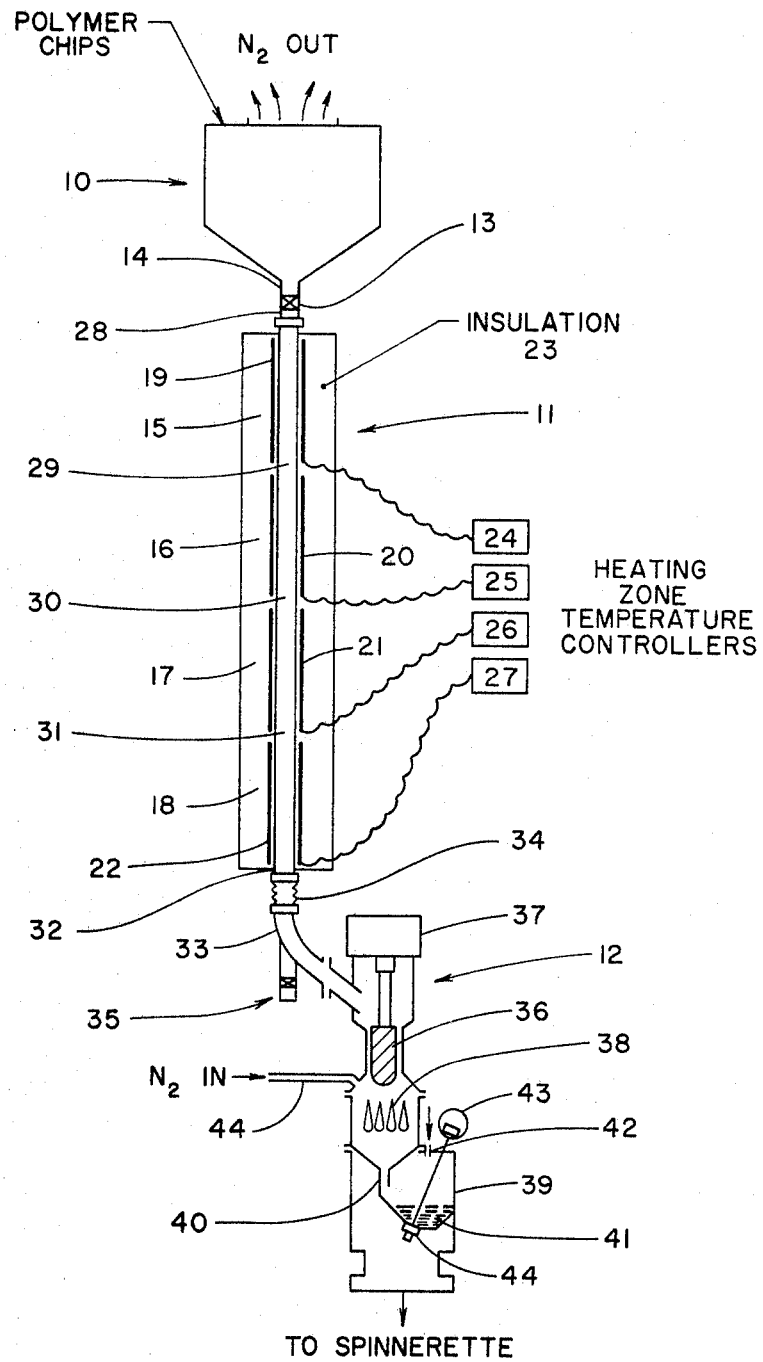

Frank Holmes Simons, Matthews, N.C., assignor to Fiber Industries, Inc., a corporation of Delaware
Filed Mar. 9, 1967, Ser. No. 621,868
Int. Cl. C08g 17/003, 20/02, 53/00
U.S. Cl. 260—78        9 Claims

ABSTRACT OF THE DISCLOSURE

A condensation polymer in chip form is heated at a temperature less than the melting point while passing an inert gas over the chips. The water content in the chips is reduced to such an extent that the polymeric material is no longer in equilibrium with its water of condensation. Upon melting the polymeric material equilibrates rapidly and results in a polymer of increased relative viscosity.

An apparatus for practicing the above process includes in combination an elongated tubular heater affixed to a conventional melter.

---

This invention relates to an apparatus and process for the production of high molecular weight polymers, especially those prepared by condensation-type reactions, such as polyamides and polyesters. More particularly, this invention relates to an apparatus and process for the production of linear polycarbonamides of a type characterized by high molecular weight including those particularly useful in the formation of shaped articles such as fibers and filaments. Even more specifically, it relates to an improved apparatus and process for increasing the relative viscosity of linear polyamides derived from dibasic acids and diamines.

STATEMENT OF THE PRIOR ART

The synthetic linear polycarbonamides or polyamides to which the description of this invention is more particularly addressed are of the general types as described in United States Patents 2,071,250; 2,071,251; 2,071,252; 2,071,253 and 2,130,948. They are commonly referred to by the generic term nylon and are characterized by the presence of recurring carbonamide groups as an integral part of the polymer chain, which groups are separated by at least two carbon atoms. They are further characterized by high melting point, pronounced crystallinity, and insolubility in most solvents except mineral acids, formic acids and phenols. Upon hydrolysis with strong mineral aids, the polymers revert to the reactants from which they were formed.

Synthetic linear polyamides are of two general types, those which are obtained from the self-polymerization of amino acids such as 6-amino-caproic acid, its amide-forming derivative, for example, epsilon-caprolactam; and those which are formed by the condensation of a diamine with a dibasic acid or an amide-forming derivative thereof. Diamines which can be condensed with equimolecular proportions of an appropriate dibasic acid to yield synthetic linear polyamides may be represented by the general formula $NH_2(CH_2)_nNH_2$ in which $n$ is an integer of 2 or greater and preferably from 2 to 8. Suitable examples are ethylenediamine, propylenediamine, tetramethylenediamine, pentamethylenediamine, hexamethylenediamine, octamethylenediamine and decamethylenediamine. Suitable dibasic acid reactants are represented by the general formula HOOCRCOOH in which R is a divalent hydrocarbon radical having a general length of at least two carbon atoms. Representative reactants of this type are sebacic acid, octadecanedioic acid, adipic acid, suberic acid, azelaic acid, undecanedioic acid, glutaric acid, pimelic acid, and tetradecanedioic acid. As has been indicated, the amide-forming derivatives thereof may be substituted for the diamine and dibasic acid reactants. Thus, the carbamate and N-formyl derivative may be used in lieu of the diamines, while the mono- and di-ester, the anhydride, the mono- and di-amide, and the acid halide may be substituted for the dibasic acid.

Nylon polymers, or superpolyamides capable of forming fibers and having molecular weights in excess of about 10,000, are conventionally prepared by a melt-polymerization process involving the condensation of a suitable diamine and dibasic acid with ordinary heating to liberate water. Often it is advantageous to isolate and purify the salt, the product resulting from the first stage of the polymerization reaction, as shown, for example, in United States Patent 2,130,947, the salt being then heated under controlled conditions of temperature and pressure, such as is disclosed in United States Patent 2,289,774, to expel water of condensation and effect polymerization.

At the beginning of the polymerization reaction, since such is a condensation reaction with the liberation of water, a large amount of water is evolved. Its ready removal from the reaction zone expedites the polymerization reaction. Moreover a low water content is advantageous because the reaction being an equilibrium one, proceeds further, the less the amount of water present. The continuing liberation of water advances the polymerization reaction. Although polymerization is usually carried out under an inert atmosphere, e.g., nitrogen, a non-solvent diluent has also been proposed as the inert environment for the reactants.

In general, since the above-mentioned polymerization is a condensation reaction with the liberation of water the amount of water liberated is an index of the degree of polymerization, which can be converted into molecular weight or viscosity criteria. Similarly the extent to which polymerization has proceeded can be estimated by other methods including determination of molecular weight and relative viscosity. The intimate relationship that exists between molecular weight and relative viscosity of polyamides is well known and, moreover, is described in detail by Mark in "Physical Chemistry of High Polymeric Systems," vol. II, Inter Sciences Publications Inc. (1940).

The relative viscosity of a polyamide is defined as the ratio of the viscosity of a solution of given strength of the polyamide in a given solvent to the viscosity of the solvent itself at the same prescribed temperature. In the case of the relative viscosity values quoted in this specification the solvent employed is a 90% by weight (solute:solution) aqueous solution of formic acid. The absolute viscosity of an 8.4% by weight (solute:solution) solution of the polyamide in the above mentioned solvent is determined and the ratio of said viscosity to the absolute viscosity of the solvent itself evaluated. The temperature employed for the determination of viscosities is 25° C. In order that a polyamide may be melt-spinnable into filaments it must have a relative viscosity ranging from at least about 25 to 55. The latter figure is obtained approximately when the process of condensation polymerization is conducted so far that at least 96% of the theoretical total water of chemical condensation i.e. of the maximum water theoretically available, is eliminated by the condensation reaction.

Whether the polycondensation reaction above-mentioned is carried out batchwise or continuously, conditions of polymerization are such that reactants and polymer at the end of the reaction are in a molten condition. Although widely used, melt polymerization is fraught with certain disadvantages. Thus, as polymerization progresses, the viscosity of the melt increases, portions of the viscous mass often tend to remain in a relatively stagnant or physically inert condition, particularly in the latter stages of the polycondensation process, and stirring becomes extremely difficult. The increasing viscosity of the molten mass tends to inhibit the efficient performance of the polycondensation reaction in that considerable difficulty is experienced in removing water from the reaction mass and the relative viscosity of the final polymer therefore becomes limited. Moreover, because of the aforementioned problems, this gives rise to poor heat transfer properties, as a result of which high temperatures and long reaction times are required to effect evaporation of volatile products and to promote favorable completion of the polycondensation reaction. Often undesirable side reactions occur with the formation of thermal degradation products and/or gel thus resulting not only in an inferior product, but necessitating shut-down for cleaning of equipment and maintenance. Even without formation of degradation products, however, the making of a high viscosity polymer in the autoclave is undesirable because it requires relatively long periods of time and because of the viscosity is difficult to discharge from the autoclave thus resulting in inefficient utilization of the autoclave, lowered productivity, and the like. In addition, as the process nears completion and the system pressures are reduced to flash off volatile material such as reaction water and like substances, excessive heat loss occurs within the system. During the sudden reduction of pressure there occurs a violent splattering of the reaction mass on the walls and pipes within the system which further restricts the transfer of heat to the reaction mass and promotes the formation of clusters of obnoxious material heretofore mentioned and commonly referred to as gels. Although the chemical composition of the gels is not understood precisely, it is known that they are objectionable and cause a substantial reduction in the quality of the polymeric end products as well as necessitating equipment shutdowns for their cleaning and removal. Moreover, it is known to be highly desirable to eliminate any gel formation because of their auto-catalytic nature. Finally, in melt polymerization it is necessary to quench large masses of high viscosity molten polymer from high to low temperatures. The reaction products cannot be rapidly cooled en masse, as a result of which portions of the reaction mass are subjected to differences in temperature and time of reaction whereby to give materials of different degrees of polymerization and hence a final product having an undesirable molecular weight range.

Numerous investigators have proposed a variety of processes of and apparatus for increasing the relative viscosities of polyamides, some of which provide continuous operation, while others are merely to improve the well-known batch or discontinuous polymerization process. For example, it is known that viscosity can be increased by equilibration of the molten polymer under vacuum, but unfortunately this is difficult and expensive to control in commercial practice. Moreover, because the polymerization reaction is, as before-mentioned a reversible reaction, this requires either immediate use of the polymer, as for example, in the formation of filaments, or desiccation of polymer chips during storage and their subsequent use. Of course immediate use of the polymer in some manufacturing operations is impossible because such requires special equipment and handling. As is well known, desiccation is attendant with many problems in addition to also requiring special equipment and handling. Chips sealed in storage cans or the like often pick up varying amounts of moisture thereby resulting in chips of varying relative viscosity and polymer of non-uniform relative viscosity necessitating steaming of the chips as in United States Patent 2,571,975. Other known methods for increasing polymer viscosity are by drying the polymer for extended periods of time at elevated temperatures in an inert atmosphere, or by the addition of trifunctional reactants. Such drying, of course, because the chips are not immediately used requires desiccation and involves the problems accompanying such as above-mentioned. In United States Patent 2,172,374 to Flory, the patentee discloses a process for increasing the molecular weight of a polyamide by heating polymer chips, said polymer having been formed by melt polymerization, at polyamide forming temperatures and below the melting point of the chips until the polyamide has undergone a substantial increase in intrinsic viscosity. British Patent 806,088 describes a process of preparing linear polyamides of a relative viscosity of at least 110 which comprises heating granular polyamide to a temperature of from 200 to 240° C., but below the melting point of the polyamide, while passing a dry inert gas therethrough and then stopping the treatment when the desired relative viscosity has been attained by rapidly cooling the treated polyamide. Similarly, a solid-state polymerization process is described in British Patent No. 802,970 and United States Patent 3,031,433. In United States Patent 2,865,895 there is disclosed yet a different polyamide polymerization process conducted in two stages wherein after the first melt polymerization, a secondary polymerization is conducted on solid polyamide particles in a liquid which is nondissolving and inert toward the polyamide, at temperatures below the melting point of the polyamide. A similar process is disclosed in United States Patent 2,987,507.

While some of these processes and apparatuses offer definite advantages, others are either very costly, inefficient, difficult to control in practice, or present serious processing disadvantages, such as the necessitating of desiccation, solvent removal, and the like. A singular disadvantage not mentioned above and possessed by all known batch polymerization processes involves the inefficiency and expense resulting from the various heating and cooling cycles involved. For example, in all the known processes involving solid phase polymerization, the polymer chips are heated, cooled, stored with desiccation, and then heated again to melt the polymer for use, such as the spinning into filaments.

It has now been discovered in accordance with the present invention that linear condensation polymers of increased viscosity can be obtained without the disadvantages of prior art processes and with apparatus which is relatively inexpensive and involves no complicated addition to present equipment, either in design or operation.

OBJECTS OF THE INVENTION

Accordingly, it is an object of this invention to provide linear condensation polymers, particularly polyhexamethylene adipamide of increased relative viscosity.

It is also an object of this invention to provide an improved process of obtaining linear condensation polymers of increased viscosity, particularly those polymers corresponding to a relative viscosity of above 50.

It is another object to provide a process by which filamentary material of superior physical properties, such as increased flex fatigue, tenacity, elongation or the like is obtained.

It is a further object to provide a novel apparatus combination by means of which polymers of increased relative viscosity can be obtained both simply and efficiently.

It is an additional object to provide a simple apparatus for increasing the relative viscosity of linear condensation polymer involving no moving parts requiring maintenance or expensive disassembly and reassembly after original installation for cleaning or mechanical maintenance.

Other objects and advantages will become readily apparent from the ensuing description of the invention.

DRAWING

The nature of the invention will be more clearly apparent by reference to the following detailed description when taken in conjunction with the drawing, in which, the sole figure thereof is a diagrammatical representation of an embodiment of apparatus used in practicing the invention.

DETAILED DESCRIPTION OF THE INVENTION

Broadly the invention contemplates a process of producing a linear condensation polymer of increased relative viscosity which comprises taking ordinary autoclave polymer in the form of particulate material, i.e. chips, heating the chips at a temperature less than the melting point while passing a stream of inert gas over the chips, and immediately melting the chips in preparation for spinning. Upon melting the polymeric material rapidly condenses and equilibrates to a polymer having an increased viscosity.

The invention is described hereinafter more particularly with respect to polyhexamethylene adipamide, i.e. nylon 66, and is superior to previously used processes both from the standpoint of cost of production and from the standpoint of uniform quality of product.

The advantages of the present process are enhanced by reason of the fact that it may be carried out by a simple apparatus addition to existing equipment.

Turning now to the drawing in which there is shown in the sole figure thereof an apparatus for the practice of my invention comprising in combination a feed hopper 10, tube heater 11, and melter 12, the invention will be described in greater detail.

Conventional polyamide chips having an ordinary autoclave relative viscosity, hereinafter referred to for sake of brevity by RV, of 50 or less, preferably 48 or less and even more desirably, less than about 45 are fed into feed hopper 10, which supplies a feed of chips to tube heater 11. The polymer chips containing about 1–1.5% water therein, which includes both dissolved water of equilibrium at the particular autoclave relative viscosity and water either absorbed or adsorbed are heated and dried in the tube and melter 12, as hereinafter more fully described. Heating the chips causes the water therein to diffuse to the surface of the chips whereby such can be removed by passing a stream of inert gas, such as nitrogen, countercurrent to the chip flow, as is shown in the drawing. It is understood, of course, by those skilled in the art that inert gases other than nitrogen can be used, e.g., carbon dioxide, argon or any of the like non-reactive gases. Nitrogen, which is at room temperature, e.g. about 20° C. or which may be heated to a temperature of about 170° C. or more, as desired, is passed into chip melter 12 through inlet 44 and a circular manifold, not shown, but which contains a plurality of exits for the nitrogen stream and is located just below screw 36 and above grid 38, and which serves to ensure better distribution of nitrogen through the body of chips located above and on grid 38. The nitrogen escapes to the atmosphere, as shown by the arrows in the drawing, carrying with it water vapor, through hopper 10. However, if desired the water-laden nitrogen gas can be processed to remove the water therefrom after which it is re-cycled into the system. Heating the nitrogen, as above suggested, can result in a small increase in relative viscosity, on the order of 1–5 RV units, depending on the nitrogen temperature. The chips are heated and dried until sufficient water has been removed therefrom to shift the polymerization equilibrium upon melting to the desired relative viscosity. Upon melting the polymerization reaction proceeds very rapidly with the liberation of water to establish a new equilibrium, and the polymer re-equilibrates in the melt pool at an increased viscosity level which, depending on the amount of water removed during drying, may be as much as 55, or even more.

It is quite surprising that relative viscosity increases can be achieved in such a two step process. Especially it is surprising that water can be removed first, i.e. before the condensation reaction occurs, at a relatively low temperature, and that the reaction is rapid enough to be finished in the few minutes available in the melt. This is particularly advantageous in that there is less time for oxidation or other side effects to occur and in that it permits the "afterpolymerization" and spinning to be one continuous operation. Contrary to other known condensation polymerization reactions, the water of condensation is not removed but instead is used in the melt pool to determine and control the final relative viscosity or degree of polymerization.

Although it is primarily intended to heat the chips in tube 11 in order to provide chips having less than their equilibrium water content to melter 12, a small amount of polymerization on the order equivalent to 1–2 RV units can be obtained, if desired, in the solid phase during the drying operation. Of course the amount of solid phase polymerization depends upon the chip temperature such just beginning to occur with polyhexamethylene adipamide at about 170° C. It should be understood, however, that this invention does not require any solid phase polymerization.

Sufficient nitrogen must be provided to carry off enough water from the chips to shift the equilibrium in the melt to the desired RV. This includes water in the chips fed to the tube heater and also that water of condensation which is produced in any solid phase polymerization which occurs in the tube. Moreover, condensation of water from the nitrogen stream must be prevented in the hopper, cooler portion of the tube and in the feed hopper. While an excess of nitrogen has no effect on RV, a shortage of nitrogen will reduce the final RV by limiting the amount of water which is removed from the chips.

Drying temperature is a process control variable of secondary importance for increasing the relative viscosity. Of greater significance, because the diffusion of moisture to the chip surface is slow and the chip temperature must be kept below the melting point, is the residence time of the chip in the tube heater during drying. Sufficient time must be allowed for diffusion of moisture to the chip surface whereby it can be carried away by the nitrogen purge stream. Merely by way of example, at a melter throughput of about 70 lb. per hr., a residence time of about 27 minutes is required in a tube 16 feet long wherein the chip temperature, measured as hereinafter disclosed, is about 170° C. and the nitrogen flow is 10 s.c.f.m. to obtain a polymer of about 65 RV. Varying the heated length of the tube or the melter throughput changes the RV by altering the residence time. If adequate residence time and nitrogen flow are available, and given adequate residence time there is no limit on RV, the heat input, i.e., the column temperature will control the degree of drying. Merely by way of example, a polymer of about 60 RV can be obtained when chips charged to the tube at a rate of from about 35 lb. per hr. to about 70 lbs. per hr., are heated for from about 60 min. to about 30 min. at a temperature of from about 130° C. to about 170° C., the nitrogen flow being from about 4 s.c.f.m. to about 8 s.c.f.m.

The final RV can be raised by increasing the Dowtherm temperature in the melter which increases the drying at and immediately above the grid. However, it should be pointed out that below a Dowtherm temperature of about 280° C. melt viscosity is too high, and that above temperatures of about 305° C. excessive gel and/or thermal degradation results in the melt pool. Preferably, the melter is operated at a Dowtherm temperature of from about 285° C. to about 290° C.

Feed hopper 10, into which is fed polymer chips for the feeding of tube polymerizer 11, can be of any desired design so long as there is maintained an adequate supply of chips to the tube heater. It can be open-topped, as shown in the drawing, and have a shape similar to a common funnel. A valve means 13 which can be a simple slide or gate-valve, is located in the spout 14 thereof for preventing undesirable flow of chips, which may be in any desired amount, depending on the relative viscosity desired in the final product, size of tube, i.e., tube inside diameter and tube length, melter capacity, residence time, and the like, as will be understood by those skilled in the art, into tube 11. Valve means 13, as will be hereinafter more fully understood, also allows for the escape of volatiles produced during the subsequent drying operation, e.g. water vapor, and the inert gas carrier, nitrogen. Of critical concern, however, with respect to valve means 13 and spout 14 is the fact that bridging of chips must be avoided in order that a constant and uniform supply of polymer chips be maintained to tube 11.

Tube 11, into which polymer chips are fed for heating and drying can be of any desired length so long as adequate residence time is allowed at the polymer throughput for the desired degree of heating and drying in order that the desired relative viscosity increase will occur in the subsequent melt polymerization. While in the particular embodiment shown in the drawing and described in the example hereinafter given the tube heater comprises a plurality of elongated tubular sections joined together in a conventional manner by flanges or the like there is no reason why it cannot be one continuous tube of the desired length. Providing the tube heater in sections, however, may present one advantage in that it can provide for a greater flexibility with respect to varying throughputs. Quite obviously, of course, whether the desired residence time is attained for any particular length tube heater depends upon the polymer chip throughput. Throughput, or polymer chip feed for a given period of time depends, of course, on the rate of use of the polymer, i.e., the rate of extrusion. It being highly desirable, of course, to melt chip at a rate substantially equal to that of the rate of extrusion, thereby keeping to a constant minimum period the exposure of the molten polymer to temperatures at which decomposition occurs. While residence time is dependent on tube length, other factors also of a critical nature are dependent on tube diameter. The inside diameter of tube heater 11 must be kept relatively small to insure plug flow and to keep the radial temperature gradient to a minimum. While the inside diameter depends, of course, to some extent on the polymer chip size, in conventionally produced irregular shaped chip passing through a ⅜ inch screen a tube having an inside diameter of from about 2 inches to about 6 inches is satisfactory. Preferably, however, the tube is about 3¼ inches inside diameter.

Heat, in the embodiment shown in the drawing, is supplied to the polymer chips in four separate and distinct heating zones 15, 16, 17 and 18 by means of conventional electrical resistance strip heaters 19, 20, 21 and 22 surrounding tube heater 11. While heat input is desirably uniform around the circumference of the tube, it of course can be supplied by other heating means, e.g., steam, heated liquids, or the like and need not be supplied in separate zones such as is shown in the drawing. Tube 11 can, for example, be jacketed so as to provide for heating the tube walls by an appropriate heating fluid, such as steam or the like. The heating elements and tube are enclosed in insulation 23. The heat supply to the polymer chips in each of the separate heating zones is controlled by means of a separate temperature controller, of conventional design, e.g., a Honeywell Versatronic, as is indicated in the drawing by reference numerals 23, 25, 26 and 27. Polymer chip temperature is determined by means of thermocouples 28, 29, 30, 31 and 32 and the heat supply is regulated accordingly to maintain the desired temperature of chips feeding into chip melter 12. The degree of drying of the chips is controlled by the chip temperature determined by thermocouple 31 which preferably is located at some distance from the end of tube 11 thereby providing a more uniform and better temperature indication by avoiding such end effects as radiation and the like. This temperature is not only the measure of drying but also the measure of polymerization which will occur in the melter. It is of course essential that the heat input source, i.e., the tube wall be well below the polymer chip melting temperature at all times which for polyhexamethylene adipamide chip means that the tube wall is desirably less than 245° C. to prevent chips sticking.

From tube 11, the polymer chips pass through feed conduit 33, which is connected to tube 11 by means of expansion joint 34, into chip melter 12. The rate of flow of chips from tube 11 must be uniform to avoid variations in residence time in the tube heater, thus avoiding varying degrees of polymerization in the melt pool and a product of non-uniform quality and properties. Located in conduit 33 is a sample point 35 comprising an outlet with a valve therein. Samples of chip discharging from the tube heater are obtained through the sample point for the determination of the degree of drying thereof and any attendant solid phase polymerization. The chip melter 12 is jacketed and of conventional design, being more fully described in United States Patent 3,010,147, the disclosure of which is incorporated herein by reference, having located therein screw feed means 36, which is rotated by means of motor 37, for feeding polymer chips into melter 12 and against a hot metal grid 38 for melting. The grid 38, as is melt chamber 39, is heated by Dowtherm heating fluid having a temperature of from about 280° C. to about 305° C., preferably 285–290° C. The polymer chips upon melting pass through the interstices in grid 38, and flow down through downspout 40 forming a body of molten polymer 41 in melt chamber 39. The molten polymer 41 is, while in the melt chamber, blanketed under inert gas, e.g., nitrogen introduced through inlet 42, and is stirred by means of agitator 43 located therein. The polymer after reaching equilibrium in the melt, i.e. after about four minutes at a throughput of 70 lbs. per hr., to a spinnerette, not shown, by booster pump 44 for the formation of continuous filaments, according to conventional spinning techniques.

By way of further illustration the invention will now be described in the following examples wherein reference to parts or percentages therein is intended to be by weight unless otherwise indicated.

Example 1

A 48% aqueous solution of hexamethylene diammonium adipate (nylon 66 salt) which may be prepared in accordance with the procedure disclosed in United States Patent 2,130,947 is charged to a stainless steel evaporator, which has been purged previously of air with purified nitrogen and is concentrated to 60% at atmospheric pressure, which corresponds to a final temperature of about 105° C. The 60% salt solution is transferred from the evaporator which is so positioned that the content thereof can be transferred when desired to a stainless steel autoclave of conventional and well-known design, such as is described in United States Patent 2,289,774. The concentrated salt solution is then heated by means of heat transfer fluid until the pressure reaches 250 p.s.i. Upon reaching 250 p.s.i., steam is gradually bled off through appropriate means and such pressure is maintained and the heating is continued until the concentration of the salt is about 90% (temperature is approximately 230° C.). Heating and bleeding of steam at 250 p.s.i. pressure are continued until the temperature reaches 245° C. whereupon the pressure is gradually reduced by accelerating the steam bleed-off for a period of 90 minutes, until the temperature has reached 270° C. and the pressure has been reduced to atmospheric. Heating at atmospheric pressure is continued until 275° C. is reached to complete the polymerization. The autoclave is brought to 100 p.s.i. by the introduction of an oxygen-free gas (e.g., nitrogen) and molten polymer is discharged as a ribbon as shown in the last-mentioned patent, by extrusion through a narrow slit in the discharge head at the bottom of the autoclave. The ribbon is quenched by well-known means such as on a water-cooled casting wheel and cut or broken up into chips by passing the ribbon through a cutting apparatus. The chips are collected in appropriate containers for transfer to the apparatus of this invention.

The chips of polyhexamethylene adipamide polymer produced as above-described and having an RV measured, as before described, of 49 and containing from about 0.5–1.0 percent $H_2O$ are forwarded at 69.4 lbs. per hr. to tube heater 11 via feed hopper 10 as previously described. The tube heater is made up of four 4' tubular sections joined together end-to-end having an internal diameter of 3¼ inches and an outside diameter of 3½ inches. Eight Chromalox electrical strip heaters each being 4' x 1½" are positioned on the tube in pairs. Each successive pair is positioned 90° to that of the adjacent pair, and are maintained at 190° C., 205° C., 205° C. and 205° C. The lower temperature corresponds to the strip heaters located in the upper tubular section, i.e. the section into which chips are fed from hopper 10. Nitrogen at room temperature, i.e. about 22° C., and in an amount of 10 s.c.f.m. having an analysis less than about 5 parts per million oxygen and 10 parts per million water is introduced into melter 12 by way of conduit 44 and the circular manifold, previously mentioned. The nitrogen is well distributed throughout the mass of chips located above and on melt grid 38 and passes up the tube heater 11 countercurrent to chip flow. The chip temperature indicated by thermocouple 31 located about four feet from the tube exit and about ½" in the chip mass is controlled with the strip heaters at the above-indicated temperatures at 172° C. to insure an adequate degree of drying of the chips. The chips pass through conduit 33 into melter 12 and are melted on melt grid 38 maintained at a Dowtherm temperature of 291° C. The polymer melt has a final RV of 65. A melt pool of about 4.4 lbs. of molten polymer is maintained in the bottom of the melter providing a residence time in the melter of about 4 minutes. The melt pool is maintained under a blanket of nitrogen, the nitrogen being introduced separately into an opening 42 near agitator 43. This nitrogen escapes out through the opening surrounding the agitator shaft. Molten polymer is supplied by booster pump 44 at a polymer throughput of 69 lbs. per hr. to 4 spinnerette packs for spinning into filaments.

Examples 2–8

The process of Example I is repeated with process conditions varied as indicated in the table below. The molten polymeric material is extruded through a spinnerette having 140 orifices therein of 0.030 inch diameter. The filaments after having lubricant applied thereto are collected together and wound into a package at 960 feet per minute according to usual technique. The packaged yarn, in the case of Examples 6–8, is then drawn at the draw ratio indicated to provide a final denier of about 860. Yarn properties on these samples are obtained according to conventional techniques.

As can be determined from the data, among other things, with increased chip temperatures one obtains increased melt polymerization.

While the invention is described herein with greater particularity with respect to nylon 66, it is of course understood by those skilled in the polymer art that such is applicable not only to other polyamides but also to other linear condensation polymers, e.g. polyesters, or mixtures of polyamides or polyamide-polyester. Moreover, it is also deemed quite obvious to those skilled in the art that use of the tube polymerizer is not restricted to grid melters. A screw extruder, for example, can be used in place of a grid melter with similar effect. If vertical space is a problem, multiple tubes, or altered tube cross-sectional shapes can be used so long as plug flow is maintained, the radial heat gradient is kept small, and chip bridging at the tube outlet to the melter is avoided. Furthermore the apparatus has utility as a drier, e.g. in the drying of polyester or polycaprolactam chips without increasing the relative viscosity thereof.

It should also be pointed out that the invention is not limited to the production of polymeric material of high relative viscosity, i.e. above 50 RV. It is equally applicable to increasing the RV in polymeric material of any relative viscosity and finds particular utility in forming textile grade polymeric material of good uniformity. The invention will allow for more efficient and effective use of conventional autoclaves. Polymerization in the autoclave can be carried on to a lower RV level thereby resulting in less gel formation, easier and faster discharge of polymer from the autoclave, thus resulting in polymer of more uniform RV and better physical properties, and a reduced autoclave cycle time with attendant increased productivity.

It is understood that the foregoing detailed description is given merely by way of illustration and that many variations may be made therein without departing from the spirit of my invention.

What is claimed is:

1. Process of forming linear condensation polyamides of increased relative viscosity of at least about 25 comprising the steps of:
    (a) forwarding preformed particulate polyamide material to a melter for melting;
    (b) heating said particulate material at a temperature less than the melting point while it is being forwarded to the melter thereby causing water in said particulate material to diffuse to the surface thereof;
    (c) passing a stream of inert gas over the heated particulate material whereby the diffused water is carried away from the particulate material thus leaving relatively dry polymer containing less than the equilibrium water content whereby the relative viscosity increase on heating, if any, is substantially small compared to the total process relative viscosity increase; and
    (d) melting the particulate material whereby the molten polyamide material rapidly further polymerizes to a polymeric material of higher relative viscosity in an attempt to re-establish equilibrium, said relative viscosities are measured on a 8.4 weight percent solution of said polyamide in aqueous 90% formic acid at 25° C.

2. Process according to claim 1 wherein the linear condensation polymer is a fiber forming polyamide.

| Example | Nylon 66 throughput, lbs./hr. | $N_2$ flow, s.c.f.m. | $N_2$ temp., °C.[1] | Chip temp., °C.[2] | Melter Dowtherm temp., °C. | Relative viscosity | | | Yarn properties | | | |
|---|---|---|---|---|---|---|---|---|---|---|---|---|
| | | | | | | Entry chip | Exit chip | Extruded yarn | Draw ratio | Tenacity | Elongation | Modulus |
| 2 | 35 | 5 | 220 | 183 | 291 | 48 | 51 | 75 | | | | |
| 3 | 70 | 10 | Not heated | 153 | 303 | 48 | 49 | 65 | | | | |
| 4 | 70 | 10 | do | 170 | 291 | 48 | 49 | 65 | | | | |
| 5 | 70 | 10 | do | 178 | 291 | 48 | 50 | 71 | | | | |
| 6 | 70 | 15 | do | 121 | 297 | 48.6 | [3] | 64.6 | 5.04 | 9.06 | 14.2 | 65.4 |
| 7 | 70 | 15 | do | 161 | 297 | 49.7 | | 65.7 | 5.04 | 9.08 | 14.6 | 59.6 |
| 8 | 70 | 15 | do | 182 | 297 | 50.2 | | 66.3 | 5.04 | 9.71 | 14.3 | 54.4 |

[1] Nitrogen temperature before entry into system.
[2] Chip temperature taken at a point about ¾ length of tube from top. (Thermocouple indicated by reference numeral 31).
[3] Not determined.

Filamentary yarn produced from the high relative viscosity polyamide of this invention finds particular utility for use as tire yarn. The yarns find utility also in carpet and other textile uses.

3. Process according to claim 2 wherein the polyamide is polyhexamethylene adipamide.

4. Process according to claim 3 wherein the inert gas is nitrogen and the flow is an amount sufficient to contain all water evaporated from the particulate material and still remain above the dew point.

5. Process according to claim 4 wherein the particulate material is heated at a temperature of from about 100° C. to about 250° C. for from about 5 minutes to about 120 minutes.

6. Process according to claim 5 wherein the particulate material forwarded to the heating zone has a relative viscosity of less than 50.

7. Process according to claim 6 wherein the particulate material being melted has a higher relative viscosity than that forwarded to the heating zone.

8. Process according to claim 5 wherein the molten polymeric material re-equilibrates corresponding to a polymer having a relative viscosity of at least about 55.

9. In a process of forming a linear condensation polyamide having a relative viscosity of at least about 55 the improvement comprising:
   (a) reacting together a dibasic acid and a diamine in an aqueous solution until a polymer having a relative viscosity of not more than about 48 is obtained;
   (b) forming particulate material of said polymeric material;
   (c) heating without melting the particulate material in order to cause water therein to diffuse to the surface thereof while passing a stream of inert gas over the particulate material whereby the relative viscosity increase on heating, if any, is substantially small compared to the total process relative viscosity increase; and
   (d) immediately melting the particulate material whereby the molten polyamide rapidly further reacts and re-equilibrates at a higher relative viscosity, said relative viscosities are measured on a 8.4 weight percent solution of said polyamide in aqueous 90% formic acid at 25° C.

References Cited

UNITED STATES PATENTS

| | | | |
|---|---|---|---|
| 2,172,374 | 9/1939 | Flory | 260—561 |
| 2,503,251 | 4/1950 | Edwards et al. | 18—54 |
| 2,706,722 | 4/1955 | Caldwell | 260—32.8 |
| 2,993,879 | 7/1961 | Gabler et al. | 260—78 |
| 3,031,433 | 4/1962 | Monroe | 260—78 |
| 3,109,835 | 11/1963 | Apostle et al. | 260—78 |
| 3,359,245 | 12/1967 | Meyer | 260—78 |

OTHER REFERENCES

Hill: Fibers from Synthetic Polymers, N.Y., Elsevier, 1953 (p. 150).

WILLIAM H. SHORT, Primary Examiner

LOUISE P. QUAST, Assistant Examiner

U.S. Cl. X.R.

23—285; 260—75; 264—176